United States Patent [19]

Cornelis

[11] Patent Number: 5,337,155
[45] Date of Patent: Aug. 9, 1994

[54] TELEVISION RECEIVER INCLUDING A TELETEXT DECODER WITH ROTATING PAGE CONTROL

[75] Inventor: Ronny M. P. Cornelis, Eindhoven, Netherlands

[73] Assignee: U.S. Philips Corporation, New York, N.Y.

[21] Appl. No.: 919,005

[22] Filed: Jul. 23, 1992

[30] Foreign Application Priority Data

Jul. 24, 1991 [EP] European Pat. Off. ............ 00201939

[51] Int. Cl.⁵ ................................. H04N 7/087
[52] U.S. Cl. ............................ 348/473; 348/468
[58] Field of Search ................ 358/147, 146, 142

[56] References Cited

FOREIGN PATENT DOCUMENTS 0180484 7/1990 Japan .............................. H04N 7/08

Primary Examiner—James J. Groody
Assistant Examiner—David E. Harvey
Attorney, Agent, or Firm—David Schreiber

[57] ABSTRACT

A television receiver including a teletext decoder is adapted to continue the further acquisition of a page in another memory after said page has been received. After each reception of the page it is checked whether this page has already been previously received and stored with the same sub-code. If this is not the case, the acquisition is continued in a further memory so that all sub-pages of a rotating page are stored without the user's intervention being required and without the displayed page rotating. If the sub-page has already been previously stored, the acquisition is continued in the previously written memory. If the sub-page is a displayed sub-page, it is replaced by the new version.

10 Claims, 3 Drawing Sheets

TELEVISION RECEIVER INCLUDING A TELETEXT DECODER WITH ROTATING PAGE CONTROL

FIELD OF THE INVENTION

The invention relates to a television receiver including a teletext decoder for acquisition, storage and display of a teletext page having a predetermined page number. The invention also relates to a teletext decoder for use in such a television receiver.

BACKGROUND OF THE INVENTION

Teletext is a transmission system in which alphanumerical and graphic information is transmitted via some picture lines of a television signal. The information is composed of pages and a plurality of such pages is transmitted cyclically. Each page is identified by a page number. In many countries, including virtually all European countries, teletext services are accessible to and very popular with the general public.

Television receivers including a teletext decoder are generally known. In their simplest form they enable the user to enter a desired page number whereafter the teletext decoder acquires, stores and displays the page having this number. Generally, it will take some time before the desired page is transmitted in the cycle and is received and displayed by the teletext decoder. In order to be able to transmit as many pages as possible in a given cycle, the broadcasting station often resorts to rotating pages. These are teletext pages having the same page number but whose contents rotate. Such pages will hereinafter be referred to as sub-pages. For example, a television program survey is allocated to two sub-pages. During one cycle the page then comprises the afternoon program, during a further cycle it comprises the evening program. If the user enters the relevant page number, the sub-page subsequently received as the first page with one of the two surveys is displayed. The sub-page with the other survey automatically follows one cycle later.

European Patent Application EP-A 0 290 000 discloses a television receiver including a teletext decoder in which a control signal is applied to the decoder for stopping the automatic rotation after the user has depressed a "stop" key. Such a television receiver enables the user to read a displayed sub-page at his leisure without being disturbed by the reception of a subsequent sub-page. However, in this case the user should realise that the actual page is a rotating page. This is often not the case. The editor of the page is at liberty to indicate whether the page is a rotating page. If he indicates this, he will often restrict himself to a symbol ">", which means "next" or "½", which means "page 1 of 2". Such indications are often unobtrusively displayed in a corner of the page. If the user overlooks such an indication and consequently does not depress the "stop" key, the automatic rotation will catch him by surprise while he is reading the page.

A further drawback of the known television receiver is that the display of "stopped" sub-pages is actually frozen. Generally this need not have been the user's intention. This will now be illustrated by way of an example. Four sub-pages having page number 570 comprise the stock exchange rates. Such data are continuously refreshed at the transmitter end. The user depressing the "stop" key when sub-page 3 with the exchange rate interesting to him is being displayed will now be deprived of a further refreshing of this sub-page. He should realise that he must "de-stop" the sub-page and wait for another reception of this sub-page.

The teletext decoder in the known television receiver further includes a multipage memory for alleviating other detrimental aspects of rotating pages. More particularly, the decoder is adapted to store in this multipage memory those teletext pages which are associated with the same rotating set and are transmitted after the "stopped" page. After having read the "stopped" sub-page, the user can call the next page with the same page number from the memory. Such a television receiver provides great convenience of use. However, in practice the receiver appears to have some drawbacks. For example, in practice it may occur that a broadcasting station transmits one and the same sub-page in two successive cycli. The reason is that the broadcasting station considers a reading time of one cycle insufficient and extends the reading time to two cycli in this manner. If a user stops the first sub-page (in order to determine its reading time himself) and if he subsequently calls the next page from the memory, this next page may appear to be a duplicate of the sub-page which he has just read. This will confuse the user. Moreover, storage space in the television receiver is wasted in this manner.

Another drawback of the known television receiver is that the available multipage memory will fill up as long as the user reads a "stopped" sub-page, even if the rotating page comprises only a small number of sub-pages.

SUMMARY OF THE INVENTION

It is an object of the invention to meet the above-mentioned drawbacks and to further enhance the convenience of use of a television receiver including a teletext decoder.

To this end the television receiver according to the invention is characterized in that the teletext decoder is adapted to read a sub-code corresponding to the displayed page and to replace the page only by a further page of the same page number if said further page has the same sub-code.

The invention is based on an increasing use by teletext broadcasting stations of the sub-code as a means to individually identify the sub-pages of a rotating teletext page. As it were, the sub-code forms an extension of the teletext page number. Non-rotating pages then have sub-code 0, rotating sub-pages have sub-code 1, 2 etc. By replacing a received page only by a subsequent page if this page has the same sub-code, it is achieved that there is no rotation of the page while the relevant sub-page is nevertheless updated continuously. It is to be noted that television receivers including a teletext decoder are known per se which employ a sub-page selection mode enabling the user to select an individual sub-page from a rotating teletext page. However, the user has to know in advance whether the page rotates and he has to know the sub-code of the sub-page desired. This is not always the case. Moreover, the user should depress a key so as to activate the individual sub-page selection mode.

A special advantage of the television receiver according to the invention is that it is not necessary to check whether the received page is actually a rotating page. Such a test, for example, a check on whether the sub-code of the received page is 0, is said to be not always as reliable as it should be. This is illustrated by the following example from practice. A broadcasting station transmits a television program survey on page 210, the afternoon survey on 210/1 and the evening survey on page 210/2. After the afternoon program has ended, the broadcasting station removes the afternoon survey from the teletext cycle. Page 210 is then no longer a rotating page, although the sub-code (either or not erroneously) maintains the value of 2.

In an embodiment of the television receiver a displayed sub-page is updated by continuing the acquisition of said page in a further memory after the displayed page has been stored in a memory and by subsequently displaying the page in said further memory if said page appears to have the same sub-code. The most recently transmitted version is then shown of the displayed page. If the page in the further memory has a different sub-code, it is possible to draw the user's attention to the presence of sub-pages. If desired, the user can call the other sub-page without any waiting time.

A further embodiment of the television receiver is characterized in that the teletext decoder is further adapted to check, upon storage of the page in a memory, whether a page of the same sub-code has been stored in a previously written memory. In that case the acquisition of the page is continued in the previously written memory. It is thereby achieved that the original memory is emptied in the case of renewed reception of a previously stored sub-page. Thus, the most topical version of sub-pages which have not (yet) been displayed is automatically preserved without wasting memory space. If a rotating teletext page 210 comprises, for example, two sub-pages, three memories are in use for their reception. Two memories, one of which is shown, always comprise the most recently received version of sub-pages 210/1 and 210/2, while one memory is in use for the acquisition of the next page 210. Possibly available further memories can then be used for receiving other teletext pages.

DESCRIPTION OF EMBODIMENTS

Figure 1:
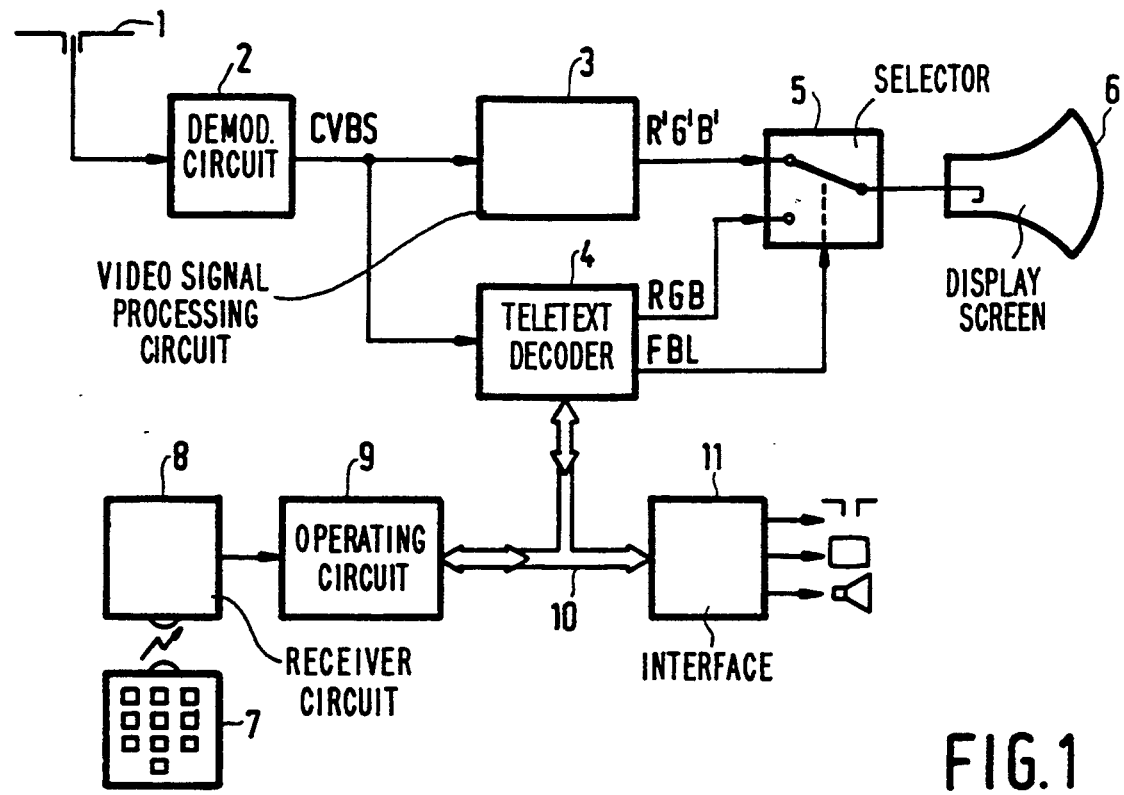
FIG. 1 shows the general structure of a television receiver according to the invention.

FIG. 1 shows the general structure of a television receiver according to the invention. The transmitter signals received at an antenna 1 are applied to a conventional tuning and demodulation circuit 2. The obtained composite video signal CVBS of the selected television program is applied to a video signal processing circuit 3 and to a teletext decoder 4. In a normal television operating state of the receiver the elementary colour signals R'G'B' are applied from video signal processing circuit 3 to a display screen 6 via a selector 5, enabling the user to watch the received television program. In a teletext operating state which can be called by the user, the elementary colour signals RGB of teletext decoder 4 are displayed on display screen 6 via selector 5. Selector 5 is operated by a blanking signal FBL which is generated in the teletext decoder. Operating instructions for the user, particularly teletext page numbers, are generated in a (remote) control unit 7 and applied to an operating circuit 9 via a receiver circuit 8. Teletext decoder 4 is connected to this operating circuit 9 by means of a command bus 10 and thus receives the page number of a desired teletext page. An interface 11 enabling operating circuit 9 to tune to transmitters, control brightness and volume and the like is connected to the command bus. This is illustrated by means of the appropriate symbols in the Figure.

Figure 2:
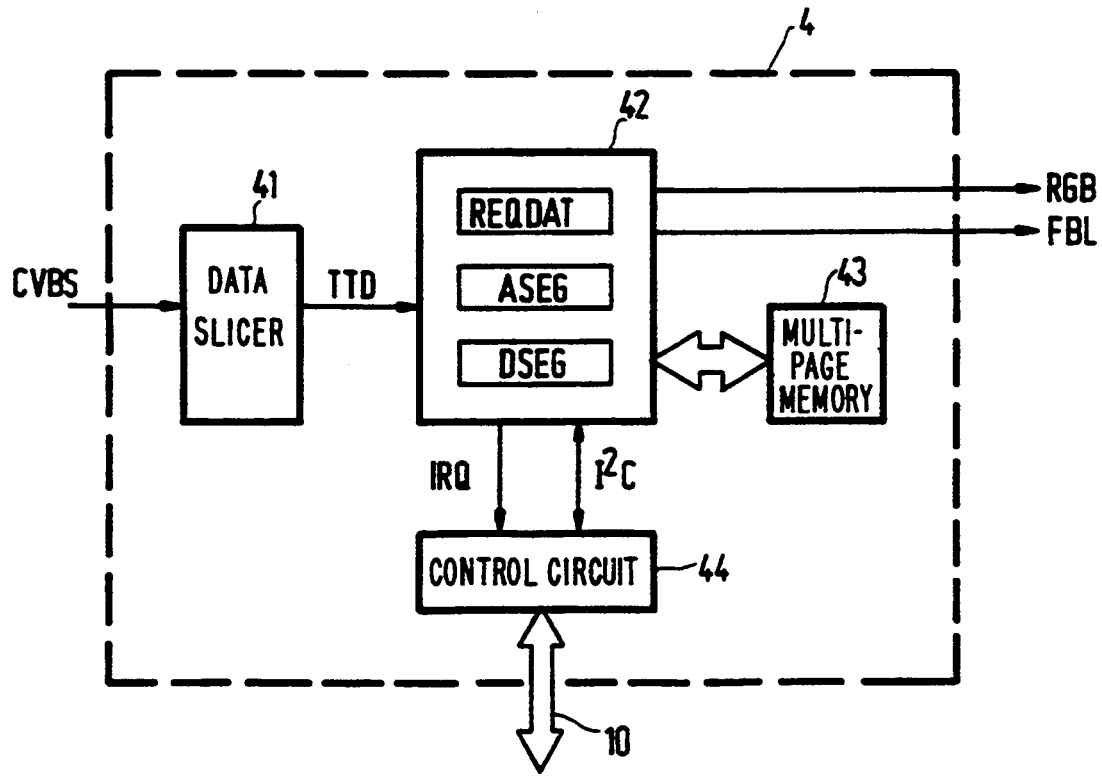
FIG. 2 shows diagrammatically the structure of a teletext decoder shown in FIG. 1.

FIG. 2 shows diagrammatically the structure of teletext decoder 4. The received composite video signal CVBS is applied to a data slicer 41, for example the integrated circuit SAA5191 of Philips. The data slicer extracts a teletext data signal TTD from video picture lines with teletext information and applies this signal to a digital video teletext (DVT) circuit 42, for example, the integrated circuit SAA9042 of Philips. The DVT is adapted for acquisition, storage and display of a plurality of teletext pages. To this end the DVT is coupled to a multipage memory 43, for example, a 128 kbyte DRAM. This memory may be considered to be divided into 64 segments of 2 kbyte each being suitable for storing a teletext page. The DVT is coupled via an I$^2$C bus to a control circuit 44 which is, for example, a microprocessor of the Philips MAB8084 type.

The DVT 42 comprises a plurality of acquisition circuits each adapted to receive a teletext page having a predetermined page number autonomically and store it in a selected segment of the multipage memory 43. Each acquisition circuit is associated with a first register for storing request data of a requested page and a second register indicating in which segment of the multipage memory this page must be stored upon reception. Only one of the acquisition circuits will hereinafter be considered. The first register associated therewith is denoted by REQDAT in the Figure, and the second register is denoted by ASEG. The two registers are accessible to the control circuit 42 via the I$^2$C bus. The acquisition circuit is also adapted to apply an interrupt signal IRQ to the control circuit 44 upon reception and storage of a requested page.

The DVT 42 further comprises a display circuit which is adapted to convert the page stored in a segment of multipage memory 43 into the displayable signals RGB and the blanking signal FBL. A register indicating which segment of the multipage memory is displayed is associated with the display circuit. This register is denoted by DSEG in the Figure. It is accessible to the control circuit 44 via the I$^2$C bus. Moreover, the page number and the sub-code of a page stored in the memory 43 can be read via the I$^2$C bus.

Figure 3:
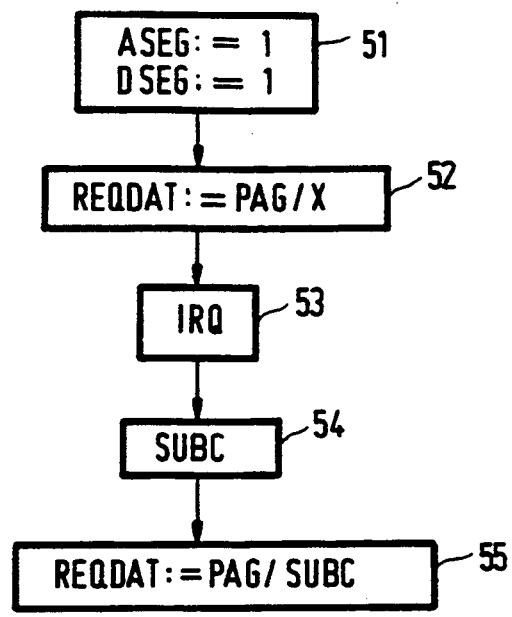
FIGS. 3-5 show flow charts of examples of a control program carried out by a control circuit shown in FIG. 2.

The operation of the teletext decoder is further based on a control program which is carried out by the control circuit 43 after the user has entered a page number PAG on the remote control unit 7 (see FIG. 1). FIG. 3 shows a flow chart of an example of the control program. In a step 51 of this program a predetermined segment number, for example 1, is applied to the registers ASEG and DSEG. In a step 52 the request data are applied to the register REQDAT. These request data are denoted by PAG/X in the Figure, in which PAG represents the page number and /X indicates that the sub-code is irrelevant as far as the acquisition of the page is concerned. The DVT now autonomously takes care of the acquisition of the requested page, its storage in memory segment 1 and its display after reception. Upon reception of the page, the DVT generates the interrupt request signal IRQ. The control program waits for this interrupt request signal IRQ in a step 53 and may meanwhile perform other tasks. In a step 54 the sub-code of the stored and displayed page is read. This sub-code is denoted by SUBC. Subsequently, the register REQDAT is written with new request data PAG/SUBC in a step 55. This results in the acquisition circuit continuing the acquisition of the page with page number PAG, but it stores this page only if the sub-code is identical to SUBC. This means that only the first received sub-page will be displayed when a rotating page is received. The other sub-pages are ignored. The displayed sub-page is, however, updated upon any further reception.

The control program shown in FIG. 3 may be adapted in such a way that the steps 54 and 55 are not performed until the user has intervened. In that case a displayed page will rotate until the user has depressed a predetermined key. He can then request, for example, page 570 stating the stock exchange rates and cause this page to rotate until page 570/3 stating the exchange rate interesting to him is displayed. A considerable advantage in this case is that the user need neither know nor enter the relevant sub-code.

Figure 4:
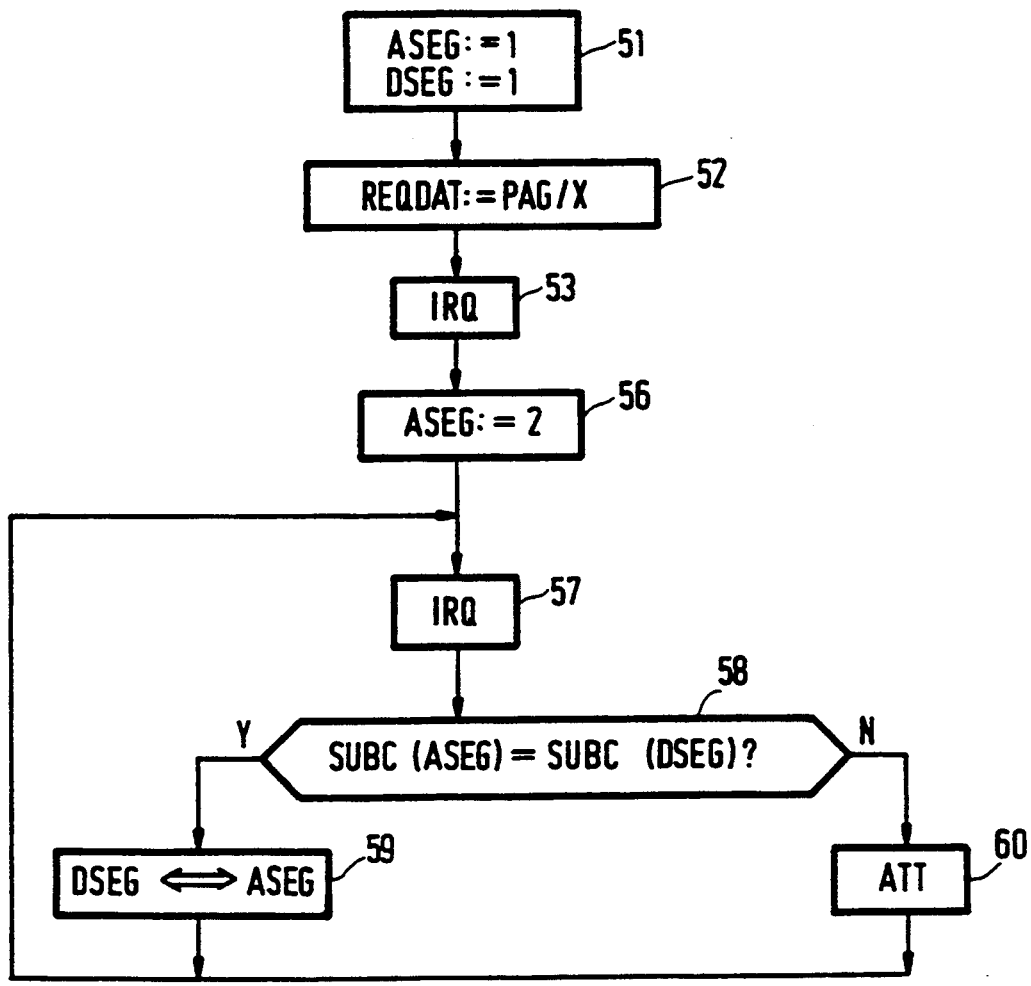

FIG. 4 shows an alternative example of the control program. The steps 51 (initiating the registers ASEG and DSEG) and 52 (applying the request data PAG/X to register REQDAT) are identical to the steps in FIG. 3 having the corresponding numerals. After reception of the interrupt request signal IRQ in the step 53, the value of 2 is applied to register ASEG in a step 56. This means that after reception and display of the requested page its further acquisition is continued in memory segment 2. After a renewed reception of the page (step 57) it is checked in a step 58 whether the sub-code of the received page, which is denoted by SUBC(ASEG), is identical to the sub-code of the displayed page which is denoted by SUBC(DSEG).

If it has been ascertained in the step 58 that the two sub-codes are identical, the value in register ASEG is exchanged with the value in register DSEG in a step 59. The result is that the page which has just been received is displayed (in practice this means that the displayed sub-page is updated) and that the acquisition is continued in the other memory segment. The control program subsequently returns to step 57 in order to wait for the next reception of the requested page.

If it has been ascertained in the step 58 that the sub-code of the received page is not identical to the sub-code of the displayed page, a step 60 is performed. In this step a visual indication is generated which draws the user's attention to the reception of the sub-page with a different sub-code, which means in practice that the received page is a rotating page. However, in this case the displayed page is not replaced. If desired, the user can call the other sub-page without any waiting time by using a "next" key. This facility requires the aforedescribed step 59 to be performed for exchanging the memories and is not shown in the Figure.

Figure 5:
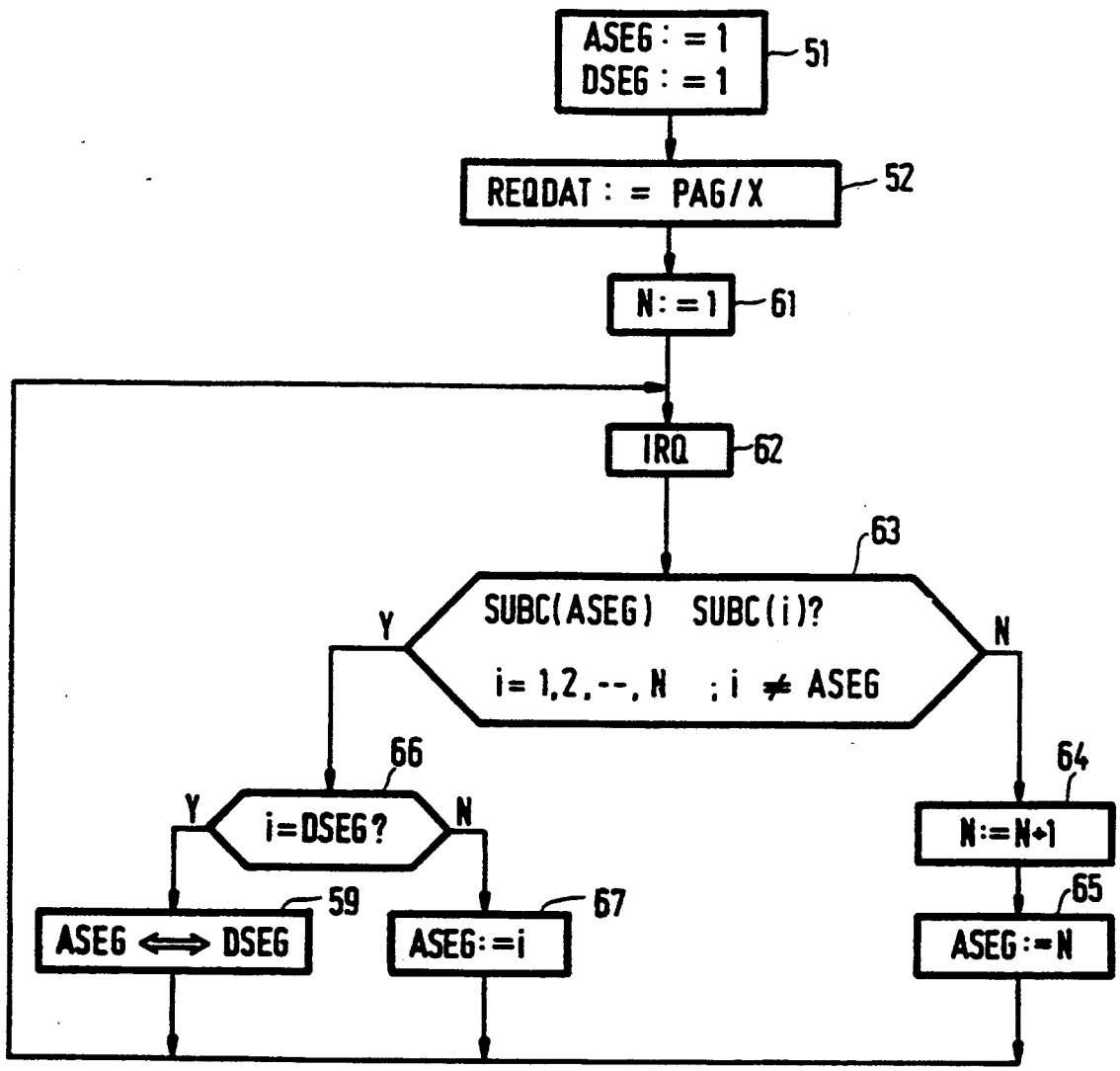

FIG. 5 flows the flow chart of a further example of a control program carried out by the control circuit. In the previously described steps 51 and 52 of this program the registers ASEG and DSEG are initiated and the request data PAG/X are applied to the register REQDAT. In a step 61 the counter N is initiated. This counter indicates in the course of the program how many memory segments are in use for receiving the requested page. The control program is continued with step 62 as soon as an interrupt request signal IRQ has been received from the DVT, which signal indicates that the requested page has been received and stored in the memory segment denoted by ASEG.

In a step 63 it is now checked whether the received sub-page has already been previously stored in a memory segment. The segment number i of this memory segment is also determined in this step. To this end the control program checks whether the sub-code SUBC(ASEG) of the page which has just been received is identical to the sub-code SUBC(i) in one of the memory segments $i=1, 2, \ldots, N$. The memory segment ASEG itself is then of course skipped.

If the requested page is received for the first time, both ASEG and DSEG still have the initial value 1 so that the received page is also displayed. The counter N still has the initial value of 1 upon the first reception. The test performed in step 63 now leads the control program to the execution of steps 64 and 65. In the step 64 the counter N is raised by 1. In the step 65 this new value of N is applied to the register ASEG. Consequently, the acquisition of the requested page is continued in a new memory segment N. The control program subsequently returns to the step 62 so as to wait for another reception of the requested page. At each storage of a new sub-page the further acquisition of the page is thus continued in a memory segment which has not yet been used. If desired, the sub-code of each new sub-page can be indicated on the display screen in order to draw the user's attention to its presence.

If it has been ascertained in step 63 that the sub-page which has just been received with sub-code SUBC(ASEG) is already stored in a memory segment i, the control program performs a step 66. In this step it is checked whether said memory segment i is the instantaneously displayed memory segment. In that case the previously described step 59 is performed in which the values in the registers ASEG and DSEG are exchanged. The result is that the page which has just been received is displayed (the displayed sub-page is updated) and that the acquisition in the redundant memory segment i is continued. In the opposite case a step 67 is performed. In this step the acquisition is also continued in the memory segment i. Thus, the previous sub-page is replaced by the updated version which has just been received. Now, however, the displayed page is not replaced. The control program subsequently returns to step 62 in order to wait for the next reception of the requested page.

If desired, the user may call the other sub-pages without any waiting time by using a "next" and a "previous" key. This facility, which is not further shown in the Figure, comprises, for example raising or lowering the value in the DSEG register or searching for a memory segment j in which the sub-page with the next higher or next lower sub-code is stored.

To illustrate the control program shown in FIG. 5, the Table below shows, as a concrete example, the storage of teletext page 570 in various memory segments. The memory segment number is stated on the left-hand side of this Table. The columns show the state after each subsequent reception of page 570. The upper side of each column state which sub-page has led to this state. The shaded areas indicate which memory segment is being displayed. The reference x indicates in which segment the acquisition of the next sub-page is effected.

|   | 570/2 | 570/3 | next  | 570/4 | 570/1 | 570/2 | 570/3 | 570/4 |
|---|-------|-------|-------|-------|-------|-------|-------|-------|
| 1 | 570/2 | 570/2 | 570/2 | 570/2 | 570/2 | x     | 570/3 | 570/3 |
| 2 | x     | 570/3 | 570/3 | 570/3 | 570/3 | 570/3 | x     | 570/4 |
| 3 |       | x     | x     | 570/4 | 570/4 | 570/4 | 570/4 | x     |
| 4 |       |       |       | x     | 570/1 | 570/1 | 570/1 | 570/1 |
| 5 |       |       |       |       | x     | 570/2 | 570/2 | 570/2 |

The first column indicates the state after the first reception of the page. In this example the first received page appears to be sub-page 570/2. This sub-page is displayed and stored in segment 1 whereafter the acquisition is continued in segment 2. The second column indicates the state after the second reception of the page. Page 570/3 appears to have been received in segment 2. The acquisition continues in segment 3 while the display of sub-page 570/2 is continued in segment 1. The third column indicates the state after the user has depressed a "next" key in order to realise the display of page 570/3. The fourth and fifth columns show the state after reception of 570/4 and 570/1, respectively. All these sub-pages are stored in a free memory segment (steps 64 and 65 in FIG. 5).

The sixth column shows the state after renewed reception of sub-page 570/2, this time in memory segment 5. It appears that this sub-page has already been previously received in segment 1. Now, the acquisition is not continued in a further memory segment but in the segment 1 which is now redundant (step 67 in FIG. 5).

Subsequently sub-page 570/3 is received again in the redundant segment. This sub-page was already stored in segment 2. Moreover it is an instantaneously displayed sub-page. Consequently, the acquisition is continued in segment 2 and the display is also switched to the segment 1 which has just been written (step 59 in FIG. 5). The displayed sub-page is thus updated.

A number of advantages of a television receiver according to the invention will be evident from the foregoing. The user neither needs to know whether a requested page is a rotating page, nor does he need to know or enter its sub-code. The number of sub-pages need not be known in advance. The number of memory segments for the reception of all sub-pages exceeds the number of sub-pages by only one. Hence, memory space is not further wasted. The other available memory segments may be used for receiving teletext pages having a different page number. Only one acquisition circuit is required for receiving the sub-pages. The other acquisition circuits (the DVT of the Philips SAA9042 type has eight circuits) can simultaneously receive the other requested pages and keep them up to date.

I claim:

1. A television receiver including a teletext decoder, said teletext decoder for extracting and displaying a page of selected teletext information included in a video signal each page of teletext information having a page number and a sub-code, said teletext decoder comprising:
   control means for extracting the teletext information from the video signal;
   means for selecting a predetermined page of teletext information;
   storage means for storing the selected page;
   first display means for displaying the selected page;
   means for displaying a further page when a sub-code of the further page is the same as the sub-code of the displayed page.

2. The television receiver as claimed in claim 1, further including second storage means for storing the further page when the sub-code of the further page is the same as the sub-code of the displayed page.

3. The television receiver as claimed in claim 2, wherein the display means displays a predetermined message when the sub-code of the further page is the same as the sub-code of the displayed page.

4. A teletext decoder for extracting and displaying a page of selected teletext information included in a video signal, each page of teletext information having a page number and a sub-code comprising:
   control means for extracting the teletext information from the video signal;
   selecting means for selecting a predetermined page of teletext information;
   storage means for storing the selected page of teletext information and corresponding sub-code; and
   display means for displaying the selected page of teletext information;
   said display means for displaying a further page of teletext information in response to the sub-code of the further page of teletext information being the same as the sub-code of the selected page of teletext information.

5. The teletext decoder of claim 4, further including second storage mean for storing the further page of teletext information when the sub-code of the further page of teletext information is the same as the sub-code of the selected page of teletext information.

6. The teletext decoder of claim 5, wherein the display means displays a predetermined message when the sub-code of the further page of teletext information is the same as the sub-code of the selected page of teletext information.

7. The television receiver as claimed in claim 1, wherein the page number of the further page is the same as the page number of the displayed page.

8. The teletext decoder as claimed in claim 4, wherein the page number of the further page is the same as the page number of the displayed page.

9. The television receiver of claim 1, wherein the further page is a further transmission of the selected page.

10. The teletext decoder of claim 4, wherein the further page is further transmission of the selected page.

* * * * *